US006883819B2

(12) United States Patent
Byrd

(10) Patent No.: US 6,883,819 B2
(45) Date of Patent: Apr. 26, 2005

(54) COMPANION RIDER WHEEL CHAIR

(76) Inventor: Marvin Byrd, 1110 Aspen St., NW., Apt. B-3, Washington, DC (US) 20012

( * ) Notice: Subject to any disclaimer, the term of this patent is extended or adjusted under 35 U.S.C. 154(b) by 0 days.

(21) Appl. No.: 10/050,393

(22) Filed: Jan. 16, 2002

(65) Prior Publication Data

US 2002/0096856 A1 Jul. 25, 2002

Related U.S. Application Data

(60) Provisional application No. 60/263,496, filed on Jan. 23, 2001.

(51) Int. Cl.[7] .................................................. B62J 1/00

(52) U.S. Cl. ................................ 280/288.4; 280/250.1; 280/292; 280/304.1

(58) Field of Search .............................. 280/250.1, 292, 280/204, 649, 647, 650, 656, 657, 208.4, 304.1, 288.4, 291

(56) References Cited

U.S. PATENT DOCUMENTS

| | | | | | |
|---|---|---|---|---|---|
| 3,937,489 | A | * | 2/1976 | Hawes et al. | 280/204 |
| 4,326,622 | A | | 4/1982 | Ellzey | |
| 4,825,971 | A | | 5/1989 | Bernstein | |
| 4,941,540 | A | | 7/1990 | Bernstein | |
| D320,579 | S | | 10/1991 | Manning et al. | |
| 5,064,209 | A | * | 11/1991 | Kurschat | 280/250.1 |
| 5,269,548 | A | * | 12/1993 | Milligan | 280/204 |
| 5,350,184 | A | * | 9/1994 | Hull et al. | 280/204 |
| 5,405,187 | A | | 4/1995 | Soderlund | |
| 5,788,255 | A | * | 8/1998 | Hayes et al. | 280/410 |
| 5,842,710 | A | * | 12/1998 | Couture | 280/204 |
| 5,915,709 | A | * | 6/1999 | Radjenovic et al. | 280/250.1 |
| 5,984,334 | A | * | 11/1999 | Dugas | 280/250.1 |
| 6,022,166 | A | | 2/2000 | Rogers et al. | |
| 6,164,674 | A | * | 12/2000 | Rogers et al. | 280/250.1 |
| 6,227,559 | B1 | * | 5/2001 | Slagerman et al. | 280/650 |
| 6,264,218 | B1 | * | 7/2001 | Slagerman | 280/43 |
| 6,302,429 | B1 | * | 10/2001 | Friedrich | 280/649 |

* cited by examiner

*Primary Examiner*—Lesley D. Morris
*Assistant Examiner*—L. Lum
(74) *Attorney, Agent, or Firm*—Dodds & Associates

(57) ABSTRACT

This invention constitutes a lightweight wheeled chair forming a companion rider device formed of hollow tubular frame members. A tow bar can be attached to the tow bar attachment with a pin coupling assembly. The tow bar attachment is mountable to the front ends of the lower side frame of the chair or it may also be permanently fixed there. The tow bar is downwardly curved from its middle and it has a feet rest. The height of the wheelchair may be adjusted by mounting the back wheels and the castor wheels in different adjusting holes provided in the chair frames and in castor wheel attachement. The present invention is to provide a lightweight wheelchair that can be used as a standalone wheelchair, as well as for a recreational use coupled to a motorized vehicle, such as an electric wheelchair.

2 Claims, 5 Drawing Sheets

COMPANION RIDER WHEEL CHAIR

BACKGROUND & CROSS REFERENCES TO RELATED APPLICATIONS

This application is entitled to benefit of Provisional Patent Application Ser. No. 60/263,496 filed on Jan. 23, 2001.

FEDERALLY SPONSORED RESEARCH

The invention that is the subject matter of the present application was not a recipient of any federal support for its research and development.

REFERENCE TO MICROFICHE APPLICATION

Not applicable.

BACKGROUND OF THE INVENTION

This invention relates to the field of wheel chair devices that are used by the physically challenged for movement and convenience.

Most wheelchairs that are found in the market are custom made to fit a particular person, with specific height and width dimensioned to suit the physical configuration of the future user of the wheelchair. Furthermore, wheelchairs found in the prior art are relatively bulky and heavy and are not easy to store because of their complicated configuration, such as the cooperative escalator and wheel chair of U.S. Pat. No. 4,326,622 (Ellzey, 1982). With respect to wheelchairs with seats are divided, U.S. Pat. No. 5,405,187 (S öderlund, 1995) describes a wheelchair where the seat is divided longitudinally. With respect to motorized wheelchair devices, they are present in the prior art, such as the motorized invalid chair transport vehicle claimed in Pat. No. D320,579 (Manning et al, 1991), and in the universal electric wheeled chair described in U.S. Pat. No. 4,941,540 (Bernstein, 1990). Nevertheless, no prior art neither of lighter wheelchairs such as the universal wheeled chair claimed in U.S. Pat. No. 4,825,971 (Bernstein, 1989)- or of motorized wheelchair describe the use of a coupling devise to allow a standard wheelchair to be coupled to a motorized devise.

With respect to devices to hold the two members together when used as companion rider wheelchair, there are locks in the prior art such as the self locking, rattle resistant fork bolt described in U.S. Pat. No. 6,022,166 (Rogers et al, 2000), but do not claim nor disclose the system used in the present invention.

BRIEF SUMMARY OF THE INVENTION

This invention constitutes a lightweight wheeled chair forming a companion rider device formed of hollow tubular frame members. The seat is preferably cantilevered from rear frame members. The frame includes two lower side frame members having back wheels mounted at the rear ends and smaller castor wheels mountable to the front end. In one embodiment the front end of the two lower side members are coupled together using two coupling frame members inter-coupling the upper side and lower side frame members to permit adjustment and collapsing of the wheeled chair. Two upper side members extend forwardly from the rear of the wheeled chair, and are secured to the rear frame members. A seat may be supported directly on these two upper side frame members, or the two upper side frame members may serve as arms for the wheeled chair, with the seat being slung from these arms at a lower position. The present invention is to provide a lightweight wheelchair that can be used as a standalone wheelchair, as well as for a recreational use coupled to a motorized vehicle.

Advantages of the new wheelchair include the fact that it is very lightweight, with the estimate of its weight being approximately 18 pounds. An additional advantage, of course, is the fact that it may be readily adjusted in height, from kitchen counter-top level to a much lower desk height level. The unit can be constructed to be foldable so that it may easily fit into the back seat or trunk of a car.

In view of the foregoing, various objects of the present invention include the following:

1. One object of the present invention is to provide a lightweight wheelchair that can be used as a standalone wheelchair, as well as for a recreational use coupled to a motorized vehicle, such as a motorized wheel chair.
2. Another object of the present invention is to provide a wheelchair in which the width of the wheelchair between the side arms may be readily varied, and wherein the height of the seat of the wheelchair may be easily changed.

BRIEF DESCRIPTION OF THE DRAWINGS

The invention will be more clearly understood after reference to the following detailed description of the preferred embodiment read in conjunction with the drawings, wherein:

FIG. 2 B Illustrates a perspective view of the adjustable wheel chair with the castor wheel assemblies attached to it.

FIG. 3 is a sectional view of the adjustable companion rider wheel chair frame and the attachable towing device.

DETAILED DESCRIPTION OF THE INVENTION

Figure 1:
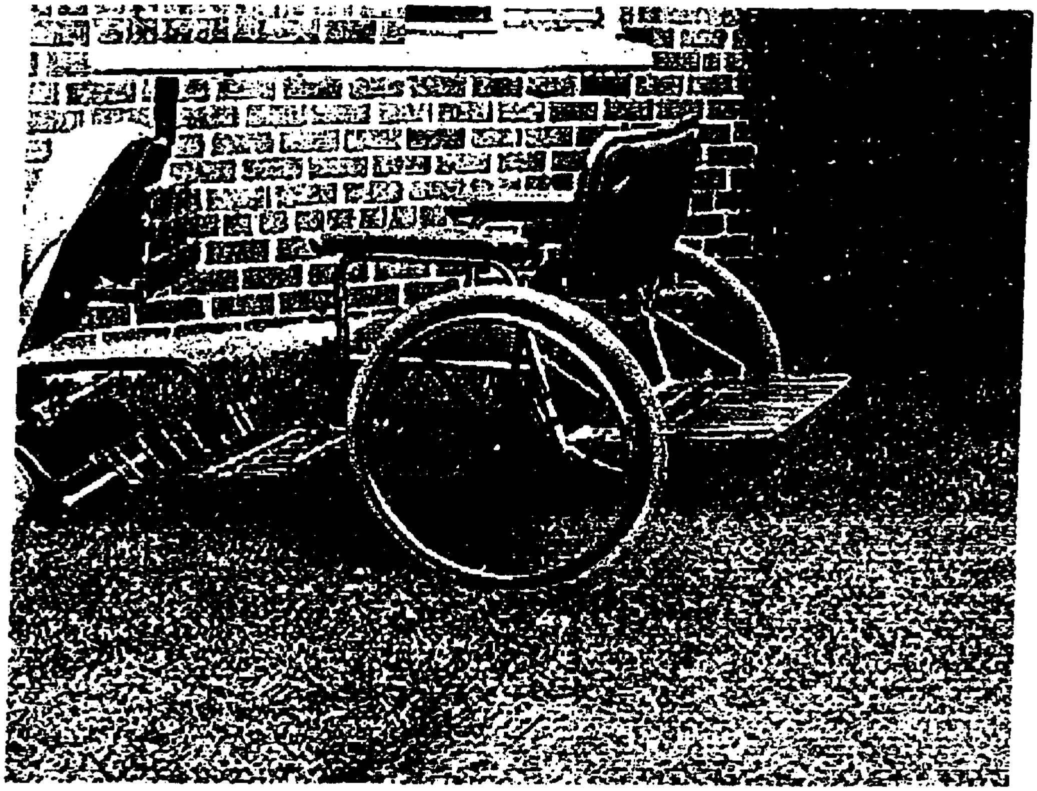
FIG. 1. is a photograph side elevation view of a wheelchair illustrating an early embodiment of the present invention.
Figure 2A:
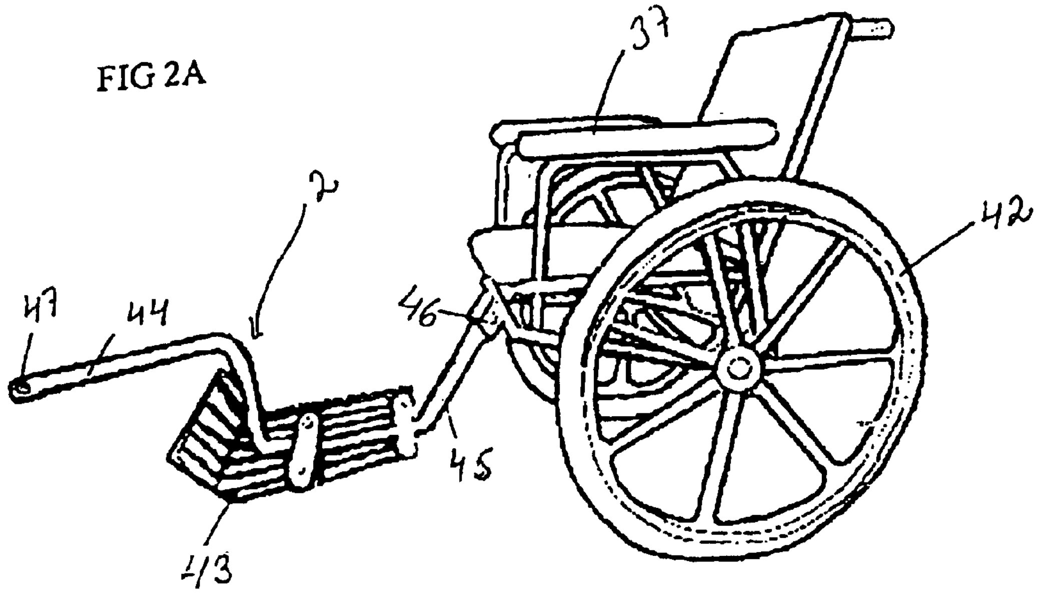
FIG. 2 A Illustrates a perspective view of the adjustable wheel chair with the towing bar device attached to it.
Figure 2B:
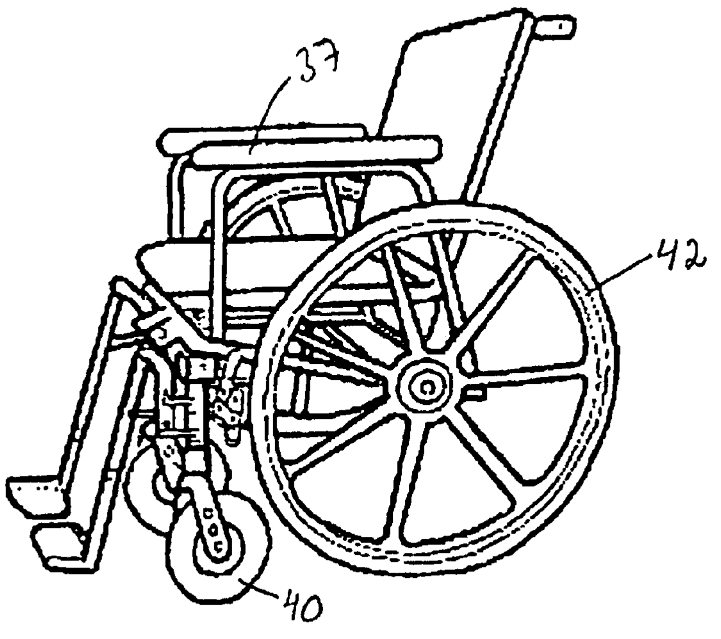
Figure 3A:
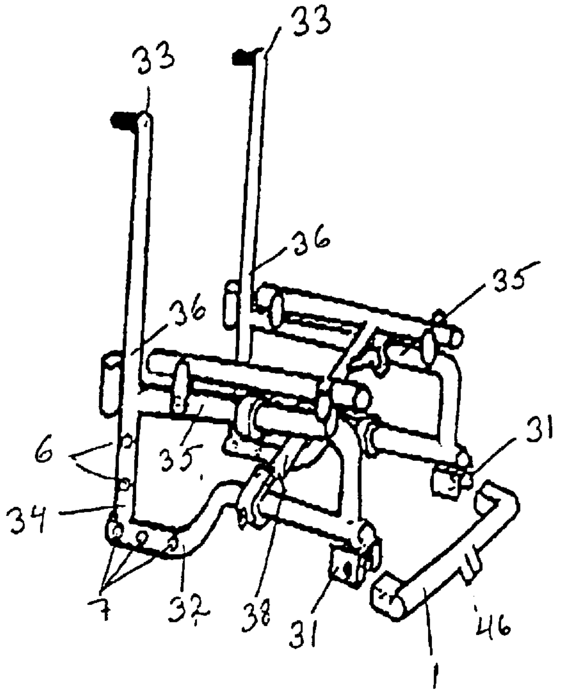
FIG. 3A illustrates the adjustable chair frame and the towing bar attachment.
Figure 3B:
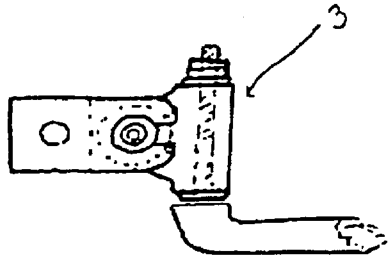
FIG. 3B illustrates the coupling system of the motorized vehicle for pin coupling of the tow bar.
Figure 3C:
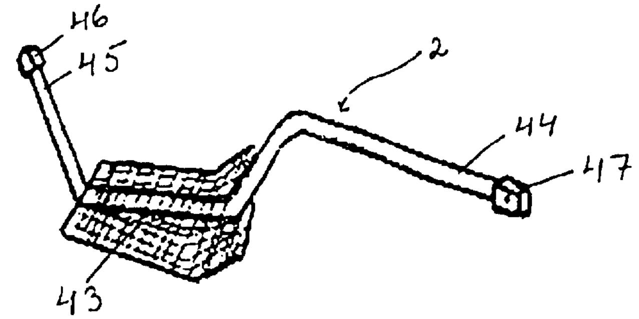
FIG. 3C illustrates the towing bar.
Figure 3D:
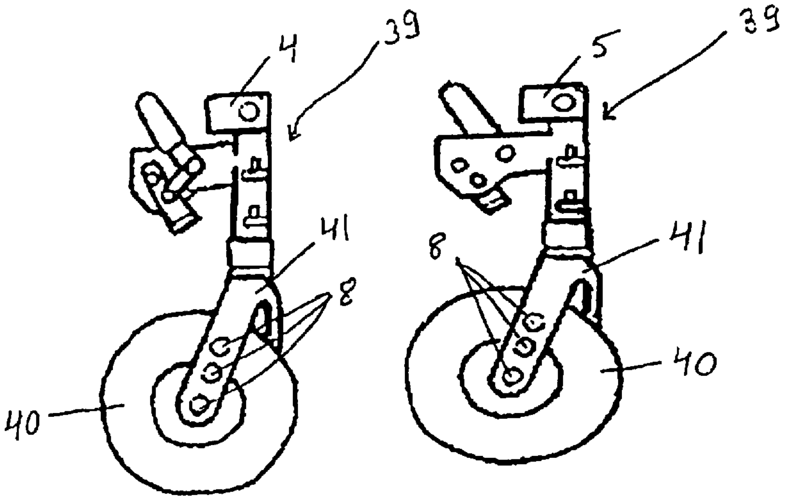
FIG. 3D illustrates the castors.

In accordance with one aspect of the present invention, a lightweight companion rider wheel chair, a frame having two lower side frame members 30, with wheels 42 mounted at front end 31 and at rear end 32 thereof, and two rear frame members 33, with the lower ends 34 of each of the rear frame members 33 being secured to the rear ends 32 of the lower side frame members 30. In addition, two forwardly extending upper side members 35 are provided, with these upper side frame members 35 being mechanically secured to the upper ends 36 of the two rear frame members 33. With regard to the arms and seat of the wheeled chair, they may be arranged in one of two alternative ways. As one alternative, the forwardly extending upper side members 35 may be the wheelchair arms, and the seat may be supported by a sling from these arms. As another alternative, another set of forwardly extending upper frame members 37 may be provided, with this set constituting the arms of the wheeled chair, and the forwardly extending upper side members 35 constituting the support for the seat. (See FIGS. 2A, B and 4). One feature of the invention is that arrangements maybe provided for changing the spacing of the side members, thereby causing the "X" configuration 38 to pivot about their central pivot point and have the arms of the wheelchair come closer or farther apart, and correspondingly raise and lower the height of the seat.

The height of the chair can be adjusted by adjusting the attachment of the castor wheels 40 and the rear wheels 42. The castors 39 are attachable to the front end 31 of the lower side frame 30 with a coupling mechanism 4, 5. The castor wheels 40 can be attached in any of the several holes 8 provided in the castor wheel attachment 41. The rear wheels 42 can be attached into any of the several holes 6 provided in the lower end 34 of the rear frames 33.

The rear wheels 42 can furthermore be adjusted depending of the weight of the person sitting in the chair by attaching the back wheels 42, into any of the several holes 7 provided in the rear end 32 of the lower side frames 30.

Figure 4:
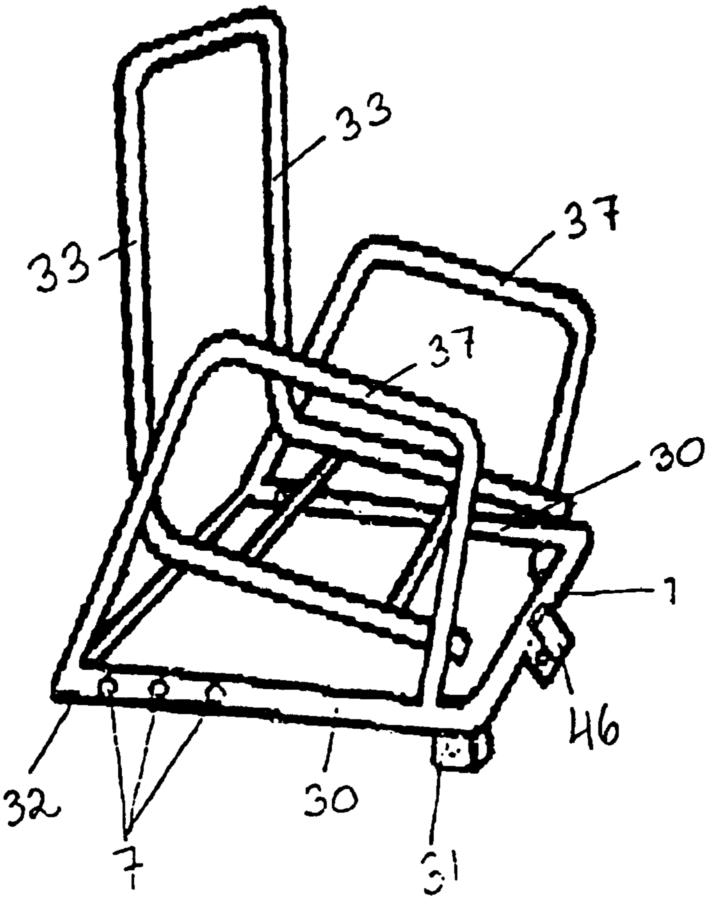
FIG. 4. illustrates an alternative embodiment of the wheelchair frame.
Figure 5:
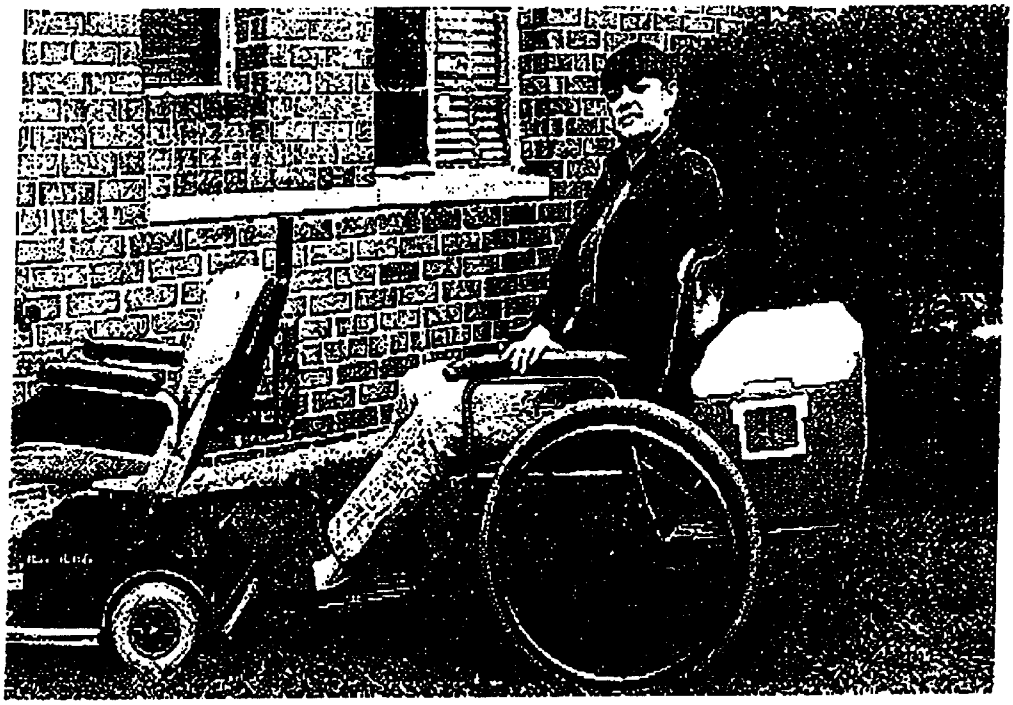
FIG. 5. is a photograph of the invention reduced to practice.

In order to use the wheel chair as a companion rider, the castor assemblies 39 are removed and instead a tow bar attachment 1 is attached in the front ends 31 of the lower side frames 30. Alternatively, the tow bar attachment is permanently fixed to the front ends of the lower side frames 30 (see FIG. 4). The rear end 45 of a tow bar 2 is attached to the tow bar attachment 1 with a pin-coupling coupler 46. The tow bar 2 is curved downwardly and the lowest part of the bar forms a rest for the feet 43. The front end 44 of the tow bar 2 is coupled to a coupling mechanism 3 in the motorized vehicle with another pin-coupling coupler 47.

Other features of the invention may involve one or more of the following:

1. The front ends 31 of the lower side members 30 may be coupled together with a combination of frame members and linear bearings, to maintain alignment of the lower side frame members.
2. Advantages of the new wheelchair include the fact that it is very lightweight, with the estimate of its weight being approximately 18 pounds.
3. An additional advantage, of course, is the fact that it may be readily adjusted in height, from kitchen counter-top level to a much lower desk height level. The unit may be collapsable so that it may easily fit into the back seat or trunk of a car.

The invention is operated by coupling the wheelchair device to a motorized vehicle such as an electric wheelchair or golf cart by means of the pin-coupling device. The rider then can be pulled along for recreational purposes by the motorized vehicle.

The invention can be used as a standalone wheelchair, or as a coupled device to a motorized devise. The wheelchair invention described here is also available as a collapsible device so it can be stored and carried easily and conveniently, such as in the trunk of a car. The alternative embodiments described here are examples only; the scope of the invention shall be as described within the claims of the invention.

This device offers a unique device for transport and recreation of those persons requiring the use of a wheelchair for movement. It improves the quality of life of the physically challenged and allows for more mobility in the community at large. The scope of the invention described here is for example only. The scope of the invention shall be determined as described within the claims of the invention.

SEQUENCE LISTING

Not applicable.

What is claimed is:

1. A companion rider wheel chair in combination with a wheelchair being suitable to be used alone, said wheelchair further comprising:

two lower side frame members, said members further having a front and a rear end, the rear end further having several holes for mounting a back wheel;

two back wheels having a diameter of 20 to 26 inches mountable to any of the holes in the rear end of the lower side frame members;

a tow bar attachment mounted to the front ends of the lower side frame members, said tow bar attachment having a pin coupling system for attachment of a tow bar;

two castor assemblies attachable to the lower side frame members;

a motorized vehicle comprising a coupling system below a seat for a pin coupling attachment of a tow bar; and a tow bar having two ends further having a downwardly curved part between the two ends, said tow bar further having a foot rest in the downwardly curved part, said tow bar having a pin-coupling system in both of its ends for coupling one end of the tow bar to the pin coupling system of the tow bar attachment of the wheel chair and the second end to the coupling system of the motorized vehicle.

2. The companion rider wheel chair of claim 1 wherein the wheelchair is collapsible.

* * * * *